United States Patent Office 2,713,515
Patented July 19, 1955

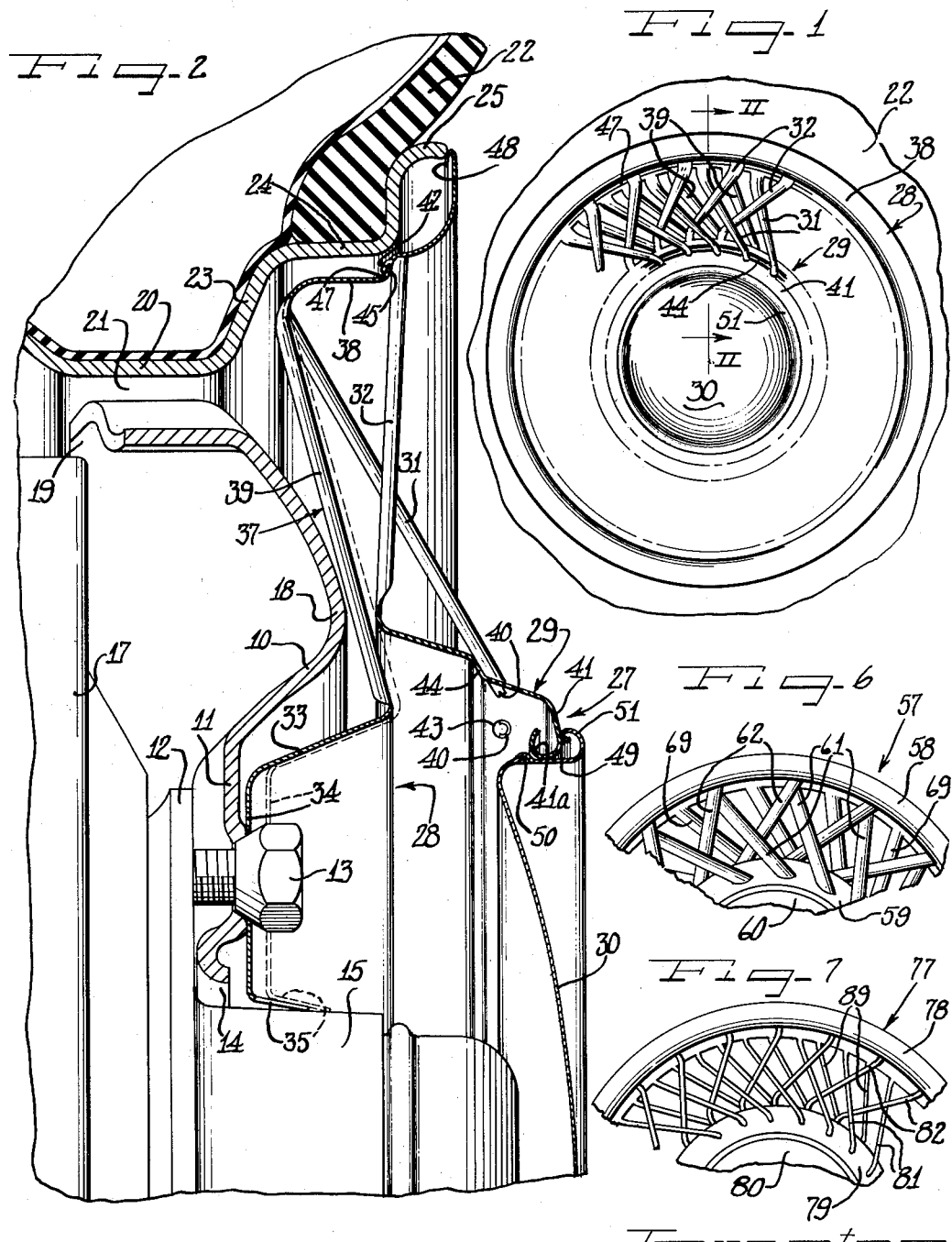

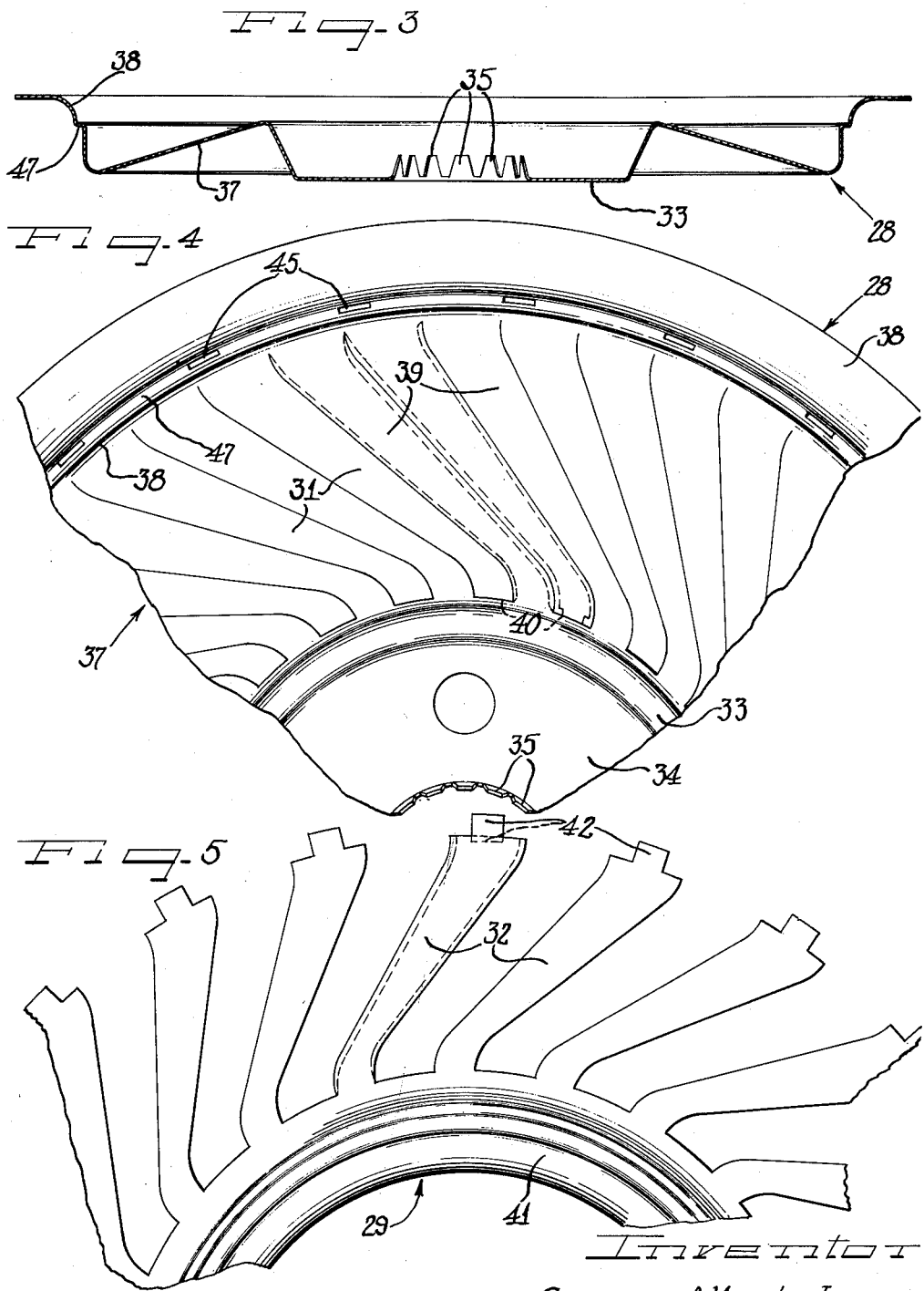

2,713,515

WHEEL COVER

George Albert Lyon, Detroit, Mich.

Application October 15, 1952, Serial No. 314,903

4 Claims. (Cl. 301—37)

The present invention relates to improvements in wheel structures and more particularly concerns the ornamental and protective covering of vehicle wheels.

An important object of the present invention is to provide a wheel structure in which a conventional disk spider type of wheel is provided with a cover affording the general appearance for the outer side of the wheel simulative of a wire spoke-type of wheel.

Another object of the invention is to provide a novel wheel cover for disposition at the outer side of a vehicle wheel and affording the general appearance of a wire spoke wheel.

A further object of the invention is to provide a wheel structure in which a wheel cover is applied in a manner to hold the same in centered, tensioned relation to the wheel.

Still another object of the invention is to provide a novel wheel cover affording a spoke-like arrangement for the outer side of a vehicle wheel and comprising a relatively simple assembly of components adapted for efficient, low cost manufacture from sheet metal parts.

Yet another object of the invention is to provide an improved bolt-on cover for the outer side of vehicle wheels.

Other objects, features and advantages of the present invention will be readily apparent from the following detailed description of certain preferred embodiments thereof taken in conjunction with the accompanying drawings, in which:

Figure 1 is a side elevational view of a wheel structure embodying the invention;

Figure 2 is a radial sectional view taken substantially on the line II—II of Figure 1;

Figure 3 is a diametrical sectional view through one of the components of the cover shown in Figures 1 and 2;

Figure 4 is a fragmentary enlarged outer side elevational view of the cover component of Figure 3 but showing the same in a further stage of production thereof;

Figure 5 is a fragmentary outer side elevational view of a second component of the cover of Figures 1 and 2 showing the same prior to completion and assembly with the cover component of Figure 4;

Figure 6 is a fragmentary outer side elevational view of a modified form of the cover; and Figure 7 is a fragmentary outer side elevational view of a further modified form of the cover.

As shown on the drawings:

A vehicle wheel with which the present invention may be used comprises a disk spider type of wheel body 10 having a dished central bolt-on flange 11 which is adapted to be secured to a hub flange 12 of a vehicle axle structure by means of attachment bolts 13. The bolt-on flange 11 has a central opening 14 through which projects a hub structure 15 of the vehicle. The flange 12 has either attached thereto or as a part thereof a vehicle brake drum 17.

The wheel body 10 has an intermediate annular axially outwardly bulging reinforcing nose prominence 18 and an outer peripheral generally axially inwardly extending attachment flange 19 secured in any suitable manner to a base flange 20 of a tire rim. At suitable intervals such as four equally peripherally spaced intervals, the attachment flange 19 is inset to provide respective ventilation openings 21.

The tire rim is preferably of the multi-flanged drop-center-type adapted to support a pneumatic tire and tube assembly 22. To this end the tire rim has a side flange 23 extending generally radially outwardly from the outer side of the base flange 20 and merging with an intermediate generally axially outwardly extending flange 24. The outer extremity portion of the tire rim is provided by a terminal flange 25.

Attached in ornamental, generally concealing and protective relation to the outer side of the wheel is a wheel cover 27. This cover is of a type that affords simulation of a wire spoke wheel at the outer side of the disk spider wheel. To this end, the cover 27 comprises a unitary assembly including a primary member 28 adapted to be attached to the wheel, and a secondary member 29 supported by the primary member and in the present instance adapted to support a central hub cap member 30. The primary and secondary members 28 and 29 are secured together by an arrangement of respective spoke-like elements 31 and 32, respectively.

According to the present invention the primary cover member 28 is constructed and arranged to be attached to the wheel by means of the attachment bolts 13. To this end, the member 28 comprises a centrally dished portion 33 which is arranged to extend generally telescopically into the centrally dished portion of the wheel body 10 and has a bolt-on flange 34 generally complementary to the bolt-on flange 11 and similarly apertured for passage of the attachment bolts 13 by which the bolt-on flange 34 is secured to the bolt-on flange 11 as an incident to attachment of the bolt-on flange 11 to the hub flange 12 of the vehicle. It will be observed in Figure 2 that the flange 34 is engaged by the tapered shoulders of the attachment bolts or nuts 13, leaving the axially inner portions of the tapered shoulders free to engage directly with the margins defining the usual bolt apertures in the bolt-on flange 11.

In order to provide for guiding the cover member 28 coaxially onto the wheel during assembly and further to provide for assisting in holding the cover against transverse, that is radial, movement in service, the central aperture of the bolt-on flange 34 of the cover member is marginally defined by a series of generally axially outwardly and radially inwardly directed resilient centering and tensioning fingers 35. These fingers extend at their tip portions normally to a smaller diameter than the outside diameter of the narrowest or outer end portion of the hub member 15, which is normally tapered toward its base, as shown. Hence, when the cover is being applied to the wheel, the fingers 35 engage uniformly under radially inward stress about the outer portion of the hub member 15 and then as the cover is pressed axially inwardly the fingers gradually cam inwardly along the member 15 and are uniformly increasingly tensioned as they are deflected radially outwardly. Thereby the cover is guided coaxially onto the wheel for substantial concentricity and further the cover is preliminarily held on the wheel until the bolts 13 are tightened. Further, the cover is temporarily held on the wheel after the bolts 13 are loosened until the cover is pulled from the wheel when desired. Moreover, the uniformly peripherally spaced and thus uniformly tensioned and mutually cooperating fingers 35 substantially assist in holding the cover against any tendency toward transverse displacement or jar-induced shifting in service.

By preference, the spokes 31 of the cover member 28 are provided integrally in one piece with the cover body 33. To this end, the body portion 33 of the member 28 extends from the bolt-on flange 34 generally axially and radially outwardly to a substantial extent outwardly beyond the peak of the nose bulge 18 of the wheel body and then extends generally radially outwardly and axially inwardly to provide an annular portion 37 that in assembly with the wheel extends beyond the nose bulge 18 and beyond the juncture of the wheel body and the tire rim adjacent to the side flange 23 of the tire rim where it connects integrally in one piece with an axially outwardly and radially outwardly directed marginal portion 38.

In the preferred construction, the cover portion 37 is initially drawn as a solid annular, and as shown herein generally frusto-conical portion as best seen in Fig. 3. Then, as shown in Fig. 4, the cover portion 37 is severed uniformly along lines extending generally diagonally thereacross to provide spoke element portions 31 which are completely severed from the body of the cover member except at their radially outer ends where they are attached integrally in one piece with the marginal cover portion 38. It will be observed that the spoke portions 31 taper uniformly toward their outer ends and that the arrangement is such that intermediate the spoke portions 31 are provided complementary and as shown substantially identical connecting rib-spoke portions 39 which at their opposite ends are connected integrally in one piece with respectively the inner body portion 33 of the member 28 and the outer marginal portion 38. While if preferred the spoke elements 31 and 39 may be left flat, they are preferably provided with a transversely arcuate or otherwise geometrically shaped contour as, for example, by convexly crowning the same preferably throughout their entire length. This provides a better appearance and substantially rigidifies the spoke elements. This transverse arching or crowning of the spoke elements is indicated in dash outline in Figure 4 and is also seen in full outline in Figures 1 and 2. At their distal end portions the spoke elements 31 are provided with respective attachment lugs 40 by which they are adapted to be attached to the secondary cover member 29 in the assembly.

The secondary cover member 29 comprises a central body portion which is preferably contoured for rigidity and comprises an annular crown flange 41 extending generally radially and having an inner marginal turned rigidifying bead 41a of an inner diameter large enough to enable access therethrough to the attachment bolts 13 of the wheel. From the crown flange 41, the body of the member 29 slopes generally axially inwardly and radially outwardly and has extending integrally in one piece from its inner margin the spoke-like elements 32. These spoke-like elements are preferably provided, as best seen in Figs. 1 and 5 substantially complementary to the spoke elements 31 of the primary cover member 28, but angled in the opposite or crossing direction, having their narrow ends attached integrally in one piece with the side of the cover member 29 while the wider, distal ends extend to a uniform diameter in uniformly spaced relation. The spoke members 32 are preferably transversely crowned similarly as the spoke elements 31 and 39, as best seen in Figures 1 and 2 and shown in dash outline in Figure 5, and at their distal end portions are provided with generally axially inwardly directed attachment flange terminals 42.

In assembly, the spoke elements 31 are bent outwardly from the intermediate primary cover portion 37 so that their distal end portions are spaced axially outwardly from the juncture of the inner cover portion 33 and the intermediate cover portion 37. The spoke elements 31 are thus angled generally radially inwardly and axially outwardly from their juncture with the outer cover portion 38 in diverging relation to the spoke members 39 of the primary cover member. The spoke elements 32 of the secondary cover member extend radially outwardly and are angled slightly axially outwardly and are disposed in crossing relation to the spoke elements 31. The distal end lugs 40 of the spoke elements 31 are assembled retainingly in respective apertures 43 provided therefor in the side of the cover member 29 adjacent to the crown flange 41 and axially outwardly from a reinforcing angular offsetting shoulder 44 adjacent thereto. The distal end flanges 42 of the spoke elements 32 are retainingly secured within respective slots 45 provided therefor in an offsetting angularly contoured, annular shoulder 47 provided intermediately in the cover marginal portion 38. The flanges 42 are preferably crimped as shown in Fig. 2 to resist withdrawal from the slots 45. The cover members 28 and 29 are thus substantially rigidly connected together. The crossing spoke members 31 and 32 provide generally triangularly related struts while at the same time affording the general appearance of spokes.

As best seen in Figure 1, each of the spoke elements 31 and 32 is in crossing relation to at least two of the adjacent opposing spoke elements of the companion cover member, being behind one of the crossing spoke elements and in front of the other of the crossing spoke elements to which it is related in the assembly.

The outer extremity portion of the marginal cover section 38 extends generally radially outwardly and has an underturned extremity flange 48 for finishing and reinforcement and which is adapted to bear against the edge of the extremity of the terminal flange 25 of the tire rim. The remainder of the marginal cover section 38 is dimensioned to lie in spaced relation to the tire rim flanges.

The construction and relationship of the primary cover member 28 to the wheel parts is such that when the attachment bolts 13 are tightened the cover body 33 is placed under substantial tension to hold the cover tight against the wheel. In this, the intermediate cover portion 37 plays an important part. By reason of the severance from the intermediate cover portion 37 of the spoke elements 31, the remaining spoke elements 39 which integrally connect the cover body 33 with the outer cover marginal portion 38, afford a flexible region in the cover member, especially at juncture of the spoke members 39 with the connected parts of the cover member. The arrangement is such that in the unattached condition of the cover with respect to the wheel, the inherent resiliency of the material such as sheet metal from which the cover is made, and especially at the rounded junctures of the spoke elements 39 with the respective cover portions draws the central cover portion 33 axially outwardly to an extent where the cover spokes 39 may bear against the axially inner margin of the cover member 29 as indicated in dash outline in Fig. 2. The spacing between the inner margin of the cover member 29 and the nose bulge 18 of the wheel body, when the cover is on the wheel is such as to afford a range of flexure movement for the spoke elements 39 in such space, the inner end portions of the spoke elements 39 extending radially inwardly substantially beyond the adjacent margin of the member 29. Hence, when the cover is applied to the outer side of the wheel the underturned outer margin 48 will bear against the tire rim terminal flange 25 and thus limit the axial extent to which the cover assembly may go insofar as the substantially rigidly connected outer marginal portion 38 and the inner secondary cover member 29 are concerned. Then as the attachment bolts 13 are tightened, the inner body portion 33 of the primary cover member 28 is drawn inwardly to the final attached position shown in full outline in Fig. 2. As a result the cover member 28 is placed under inward tension by resilient yielding of the intermediate cover portion 37, or more strictly the spoke elements 39 of such intermediate cover portion.

The hub cap member 30 is provided with an axially outwardly extending marginal flange 49 which is dimensioned to fit slidably within the aperture defined by the turned beaded margin 41a of the cover member 29. For retaining engagement with the bead 41a, the flange 49 is preferably provided adjacent juncture with the body of the hub cap 30 with a series of spaced radially outwardly projecting retaining bumps or protrusions 50 which are adapted to engage in snap-on pry-off relation with the bead 41a. At its outer extremity, the flange 49 is turned generally radially outwardly and axially inwardly and underturned to provide a reinforcing and stop bead 51 which engages against the outer side of the cover member flange 41 to retain the retaining bumps 50 under tensioned engagement with the bead 41a. For prying the hub cap 33 from the cover member 29, a pry-off tool such as a screwdriver may be applied behind the turned marginal bead 51 and pry-off leverage applied to snap the retaining bumps 50 from behind the bead 41a.

In the modification of Figure 6, a cover 57 is shown comprising a composite cover assembly substantially like the cover 27, and including a primary cover member 58, a secondary cover member 59 and a hub cap member 60 which in general construction are substantially the same as the corresponding cover members 28, 29 and 30 of the cover 27. However, in the cover 57, the spoke elements are preferably modified to the extent that they may be made fewer in number and preferably of uniform width throughout, with each of the three rows of spoke elements of the same width, providing spoke elements 61 integral with the cover member 58 and attached to the cover member 59, and spoke elements 62 integral with the cover member 59 and crossing the spoke elements 61 and attached to the cover member 58, while integral connecting spoke elements 69 connect radially inner and radially outer parts of the cover member 58 similarly as the spoke elements 39 connect the radially inner and outer parts of the cover member 28. However, the spoke elements 61, 62 and 69 are all of uniform width and may be substantially semi-cylindrical or cylindrical in shape. It will be observed that the spoke elements 61 and 62 are in crossing relation and each is in crossing relation to at least two of the opposing crossing spoke elements. Likewise the spoke elements 62 extend in substantially crossing relation to two of the spoke elements 69, similarly as the spoke elements 32 in Figs. 1 and 2 cross at least two of the spoke elements 39.

In Fig. 7 is shown a modified cover 77 which has components comprising a principal cover member 78, a secondary cover member 79 and a central hub cap cover member 80. The cover member 78 has spoke elements 81 connected to the cover member 79 while the cover member 79 has spoke elements 82 connected to the cover member 78, and the cover member 78 has connecting spoke elements 89 which connect inner and outer portions of the cover member 78. The construction and relationship of the cover members 78, 79 and 80 is substantially the same as the corresponding cover elements of the cover 27. However, the spoke elements are preferably of a substantially smaller cross-section and are preferably semi-cylindrical or cylindrical in cross-section substantially as shown, more nearly approximating a true wire spoke wheel structure in appearance. The relationship of the spoke elements 81, 82 and 89 is substantially like that of the spoke elements of the covers 27 and 57, that is the crossing spoke elements being in crossing relation to respectively at least two of the spoke elements that lie in crossing relation thereto.

It will be understood that modifications and variations may be effected without departing from the scope of the novel concepts of the present invention.

I claim as my invention:

1. In a wheel structure including a multi-flange tire rim and a wheel body having a central bolt-on flange attached by attachment bolts to a vehicle axle including a hub portion projecting through the bolt-on flange and having a tapering periphery, a cover for disposition at the outer side of the wheel comprising a central bolt-on flange portion having means for engagement by the attachment bolts to secure the cover against the wheel and having means engageable with the hub portion under resilient tension for centering the cover on the wheel.

2. In a wheel structure including a multi-flange tire rim and a wheel body having a central bolt-on flange attached by attachment bolts to a vehicle axle including a hub portion projecting through the bolt-on flange and having a tapering periphery, a cover for disposition at the outer side of the wheel comprising a central bolt-on flange portion having means for engagement by the attachment bolts to secure the cover against the wheel and having means engageable with the hub portion under resilient tension for centering the cover on the wheel, said centering means comprising a series of angled resilient fingers cammingly engageable with the hub portion.

3. In a wheel structure including a tire rim and a body portion having an attachment flange for securing the wheel to a vehicle by means of attachment bolts, a cover for the outer side of the wheel comprising a one-piece sheet metal member having a radially outer portion engageable with the tire rim and a radially inner portion attachable to the wheel body by the attachment bolts, and a series of generally radially extending spoke elements formed integrally in one piece with said radially inner and radially outer cover portions and connecting the same together, said spoke elements being connected angularly to the radially inner cover portion and normally extending axially outwardly to a predetermined extent, said radially inner cover portion being deflected axially inwardly toward the wheel body by the attachment bolts and thereby deflecting the radially inner portions of the spoke elements axially inwardly therewith and thereby maintaining the radially outer portion of the cover pressed against the tire rim.

4. In a wheel structure including a wheel having a central bolt-on flange through which projects a wheel axle hub, a cover for disposition at the outer side of the wheel comprising a centrally apertured member having at the margin defining the aperture means projecting generally inwardly for resilient centering engagement with said wheel axle hub, and means for securing the cover to the wheel.

References Cited in the file of this patent

UNITED STATES PATENTS

| Re. 19,467 | Lyon | Feb. 12, 1935 |
| 734,588 | Miller | July 28, 1903 |
| 1,973,161 | Ash | Sept. 11, 1934 |
| 2,037,981 | Horn | Apr. 21, 1936 |
| 2,094,326 | Lyon | Sept. 28, 1937 |
| 2,386,225 | Lyon | Oct. 9, 1945 |
| 2,699,360 | Jenkins | Jan. 11, 1955 |

FOREIGN PATENTS

| 714,587 | France | Sept. 7, 1931 |